United States Patent
Chen et al.

(10) Patent No.: US 12,199,902 B2
(45) Date of Patent: Jan. 14, 2025

(54) ANALOG CSF FOR FDD PARTIAL RECIPROCITY

(71) Applicant: QUALCOMM Incorporated, San Diego, CA (US)

(72) Inventors: Bo Chen, Beijing (CN); Joseph Binamira Soriaga, San Diego, CA (US); Pavan Kumar Vitthaladevuni, San Diego, CA (US); Yu Zhang, San Diego, CA (US); Chenxi Hao, Beijing (CN); Ruifeng Ma, Beijing (CN); Krishna Kiran Mukkavilli, San Diego, CA (US); Tingfang Ji, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 17/595,560

(22) PCT Filed: Jun. 9, 2020

(86) PCT No.: PCT/CN2020/095055
§ 371 (c)(1),
(2) Date: Nov. 18, 2021

(87) PCT Pub. No.: WO2020/253573
PCT Pub. Date: Dec. 24, 2020

(65) Prior Publication Data
US 2022/0263620 A1     Aug. 18, 2022

(30) Foreign Application Priority Data
Jun. 19, 2019 (WO) ................ PCT/CN2019/091882

(51) Int. Cl.
*H04L 5/00* (2006.01)
*H04B 7/0456* (2017.01)
(Continued)

(52) U.S. Cl.
CPC ......... *H04L 5/0048* (2013.01); *H04B 7/0456* (2013.01); *H04B 7/0626* (2013.01);
(Continued)

(58) Field of Classification Search
None
See application file for complete search history.

(56) References Cited

U.S. PATENT DOCUMENTS 10,826,577 B2    11/2020  Wei et al.
11,212,794 B2 *  12/2021  Kakishima ............ H04W 16/28
(Continued)

FOREIGN PATENT DOCUMENTS

CN    103517288 A    1/2014
CN    106470086 A    3/2017
(Continued)

OTHER PUBLICATIONS

International Search Report and Written Opinion—PCT/CN2019/091882—ISA/EPO—Mar. 17, 2020.
(Continued)

*Primary Examiner* — Jutai Kao
(74) *Attorney, Agent, or Firm* — Procopio, Cory, Hargreaves & Savitch LLP

(57) ABSTRACT

A user equipment (UE) receives a first channel state information reference signal (CSI-RS) on a first set of beams and receives a second CSI-RS on a second set of beams. The apparatus determines a channel quality indicator (CQI), a rank indicator (RI), and a precoding matrix indicator (PMI) based on the first CSI-RS. The apparatus reports the CQI and RI using an uplink control channel and indicates the PMI using a precoded SRS transmission. The precoded SRS transmission may be precoded based on a dissimilarity between the first CSI-RS and the second CSI-RS. The first CSI-RS may include a defined precoder, and the second
(Continued)

CSI-RS may include a precoder based on an uplink channel estimate of a non-precoded SRS from the UE.

29 Claims, 9 Drawing Sheets

(51) Int. Cl.
*H04B 7/06* (2006.01)
*H04W 72/21* (2023.01)

(52) U.S. Cl.
CPC ....... *H04B 7/06966* (2023.05); *H04L 5/0053* (2013.01); *H04W 72/21* (2023.01)

(56) References Cited

U.S. PATENT DOCUMENTS

| | | | |
|---|---|---|---|
| 11,343,033 B2* | 5/2022 | Yum | H04L 5/0035 |
| 2014/0177744 A1 | 6/2014 | Krishnamurthy et al. | |
| 2018/0152856 A1* | 5/2018 | Davydov | H04B 7/0413 |
| 2018/0205440 A1* | 7/2018 | Enescu | H04B 7/0626 |
| 2019/0149216 A1 | 5/2019 | Tsai et al. | |
| 2019/0296854 A1* | 9/2019 | Kubo | H04L 1/0026 |
| 2019/0356364 A1* | 11/2019 | Maamari | H04L 5/0062 |
| 2020/0287683 A1* | 9/2020 | Kwak | H04B 7/0626 |
| 2020/0395989 A1* | 12/2020 | Faxér | H04L 5/0057 |
| 2022/0376767 A1* | 11/2022 | Nilsson | H04B 7/0862 |

FOREIGN PATENT DOCUMENTS

| | | |
|---|---|---|
| CN | 107624225 A | 1/2018 |
| CN | 107733506 A | 2/2018 |
| CN | 108111278 A | 6/2018 |
| CN | 109075847 A | 12/2018 |
| CN | 109644039 A | 4/2019 |
| WO | 2017136749 A1 | 8/2017 |
| WO | 2020156492 A1 | 8/2020 |
| WO | 2020248147 A1 | 12/2020 |

OTHER PUBLICATIONS

International Search Report and Written Opinion—PCT/CN2020/095055—ISA/EPO—Sep. 10, 2020.
Qualcomm Inc: "SRS Capacity Enhancements", 3GPP Draft, 3GPP TSG-RAN WG1 #82, R1-153881, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), 4 Pages, XP051001317, Retrieved from the Internet: URL:http://www.3gpp.org/ftp/Meetings_3GPP_SYNC/RAN1/Docs/ [retrieved on Aug. 23, 2015], section 2.2.
Huawei, et al., "Discussion on Reciprocity Based CSI Acquisition Mechanism", 3GPP TSG RAN WG1 NR Ad Hoc Meeting, R1-1711404, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017 Jun. 26, 2017, XP051300592, 4 Pages.
Supplementary European Search Report—EP20826887—Search Authority—Munich—Jan. 13, 2023.

* cited by examiner

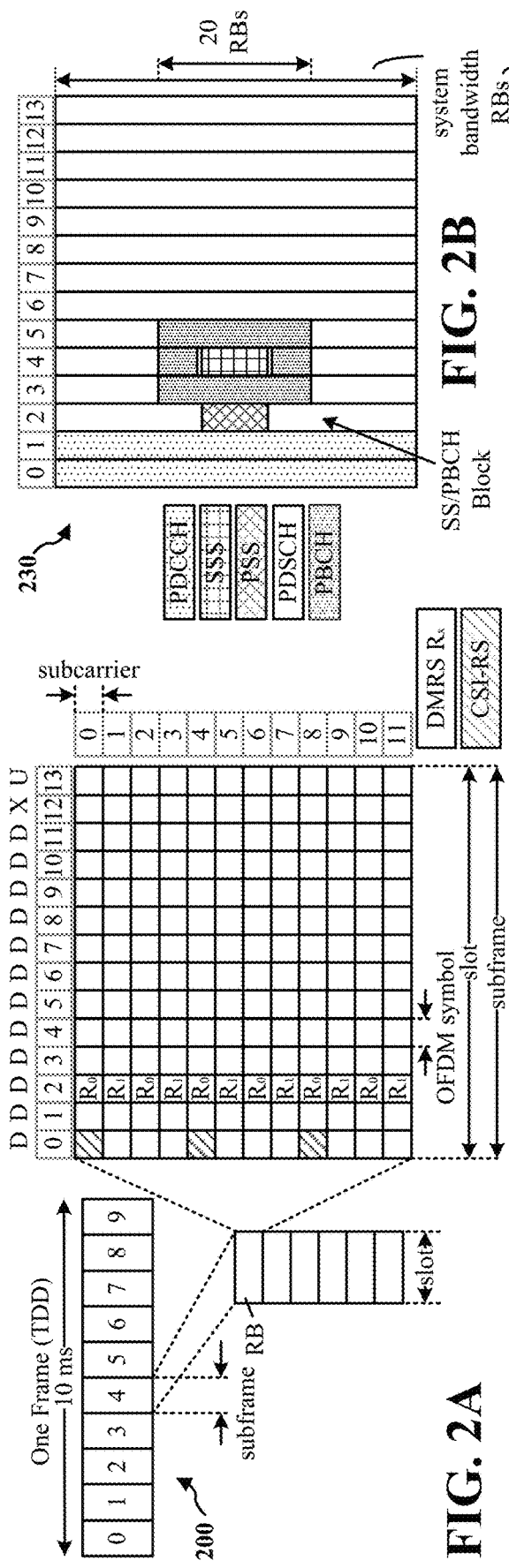
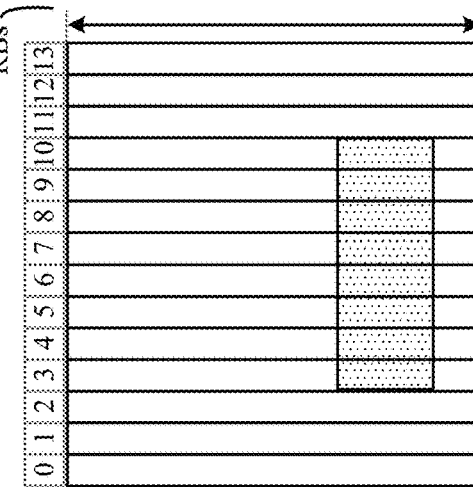
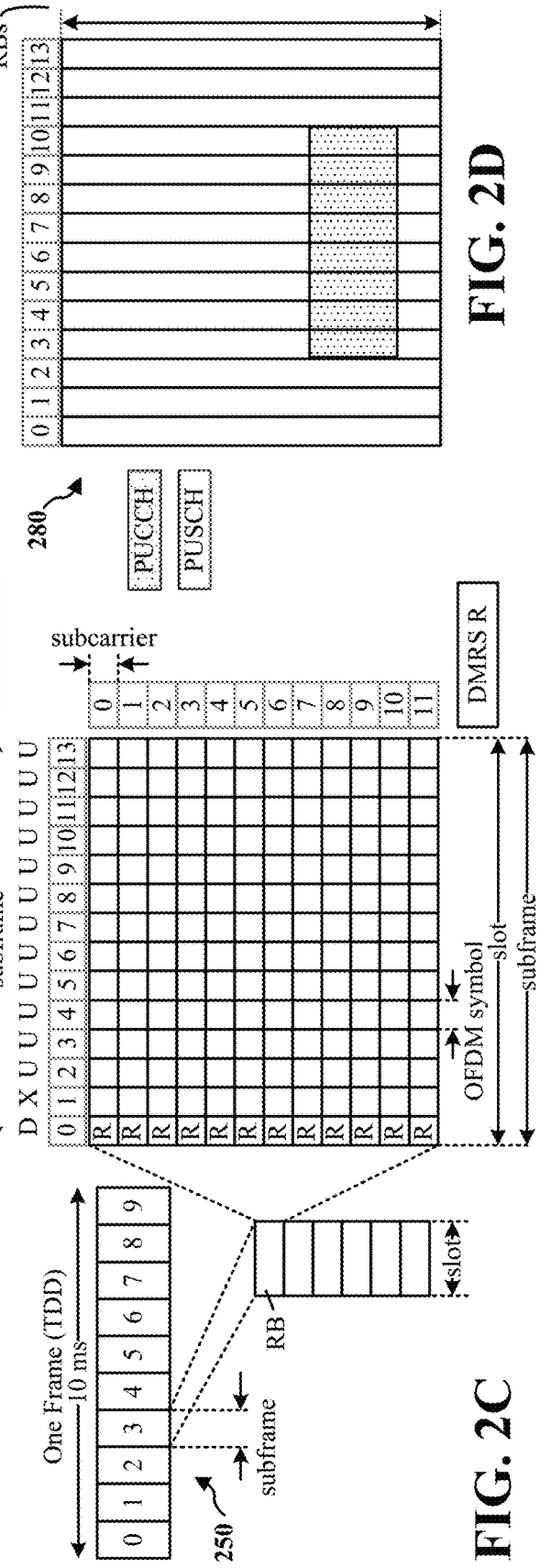
FIG. 2A
FIG. 2B
FIG. 2C
FIG. 2D

ANALOG CSF FOR FDD PARTIAL RECIPROCITY

CROSS REFERENCE TO RELATED APPLICATIONS

This application is a National Stage Application filed under 35 U.S.C. § 371 of PCT International Patent Application Serial No. PCT/CN2020/095055, entitled "ANALOG CSF FOR FDD PARTIAL RECIPROCITY" and filed on Jun. 9, 2020, which claims priority to International Patent Application Serial No. PCT/CN2019/091882, entitled "ANALOG CSF FOR FDD PARTIAL RECIPROCITY" and filed on Jun. 19, 2019, which is expressly incorporated by reference herein in its entirety.

BACKGROUND

Technical Field

The present disclosure relates generally to communication systems, and more particularly, to channel state information (CSI) for wireless communication including frequency division duplex (FDD) partial reciprocity.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as, with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

Wireless communication devices including base stations and user equipment (UE) may measure signals and provide information regarding channel quality. For example, a base station may transmit a channel state information reference signal (CSI-RS) to the UE, and the UE may respond with information determined based on the CSI-RS. Aspects presented herein enable the UE to provide channel state information in a more efficient manner, such as for frequency division duplex (FDD) communication with relatively small duplex separation. The improvements described herein may be applicable to 5G NR and may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may transmit a channel state information reference signal (CSI-RS) that is used by a user equipment (UE) to estimate a channel and report channel quality information back to the base station. The reported information may be referred to as channel state information feedback (CSF). The UE may report the CSF, such as a channel quality indicator (CQI), a rank indicator (RI), and a precoding matrix indicator (PMI), based on the measured CSI-RS resources.

A UE may experience similar scattering and rank distribution for uplink and downlink communication for frequency division duplex (FDD) communication with a relatively small duplex separation. Aspects presented herein improve CSF for FDD communication and enable the UE to further provide dissimilarity information about multiple, associated CSI-RS through a precoded SRS.

As presented herein, a base station may transmit a first CSI-RS on a first set of beam and a second CSI-RS on a second set of beams. A UE may determine a CQI, an RI, and a PMI based on the first CSI-RS and report to the CSI and RI to the base station. The UE may indicate the PMI to the base station using a precoded sounding reference signal (SRS). For example, the UE may determine a dissimilarity between the first CSI-RS and the second CSI-RS and may further indicate the dissimilarity to the base station based on the precoding of the SRS. The base station may use the CQI, the RI, the PMI, and the dissimilarity between the two CSI-RS to improve communication with the UE.

In an aspect of the disclosure, a method, a computer-readable medium, and an apparatus are provided for wireless communication. In some examples, the method may be performed by a UE. The UE receives a first CSI-RS on a first set of beams and receives a second CSI-RS on a second set of beams. The UE determines a CQI, and RI, and a PMI based on the first CSI-RS. The UE reports the CQI and RI using an uplink control channel and indicates the PMI using a precoded SRS transmission. The precoded SRS transmission may be precoded based on a dissimilarity between the first CSI-RS and the second CSI-RS.

In another aspect of the disclosure, a method, a computer-readable medium, and an apparatus are provided for wireless communication. In some examples, the method may be performed at a base station. The base station transmits a first CSI-RS on a first set of beams and transmits a second CSI-RS on a second set of beams. The base station then receives a report of CQI and RI based on the first CSI-RS, where the report is received in an uplink control channel from a UE. The base station receives a precoded SRS from the UE, and determines a PMI based on the precoded SRS.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first new radio (NR) frame, downlink channels within an NR subframe, a second NR frame, and uplink channels within an NR subframe, respectively.

DETAILED DESCRIPTION

Figure 1:
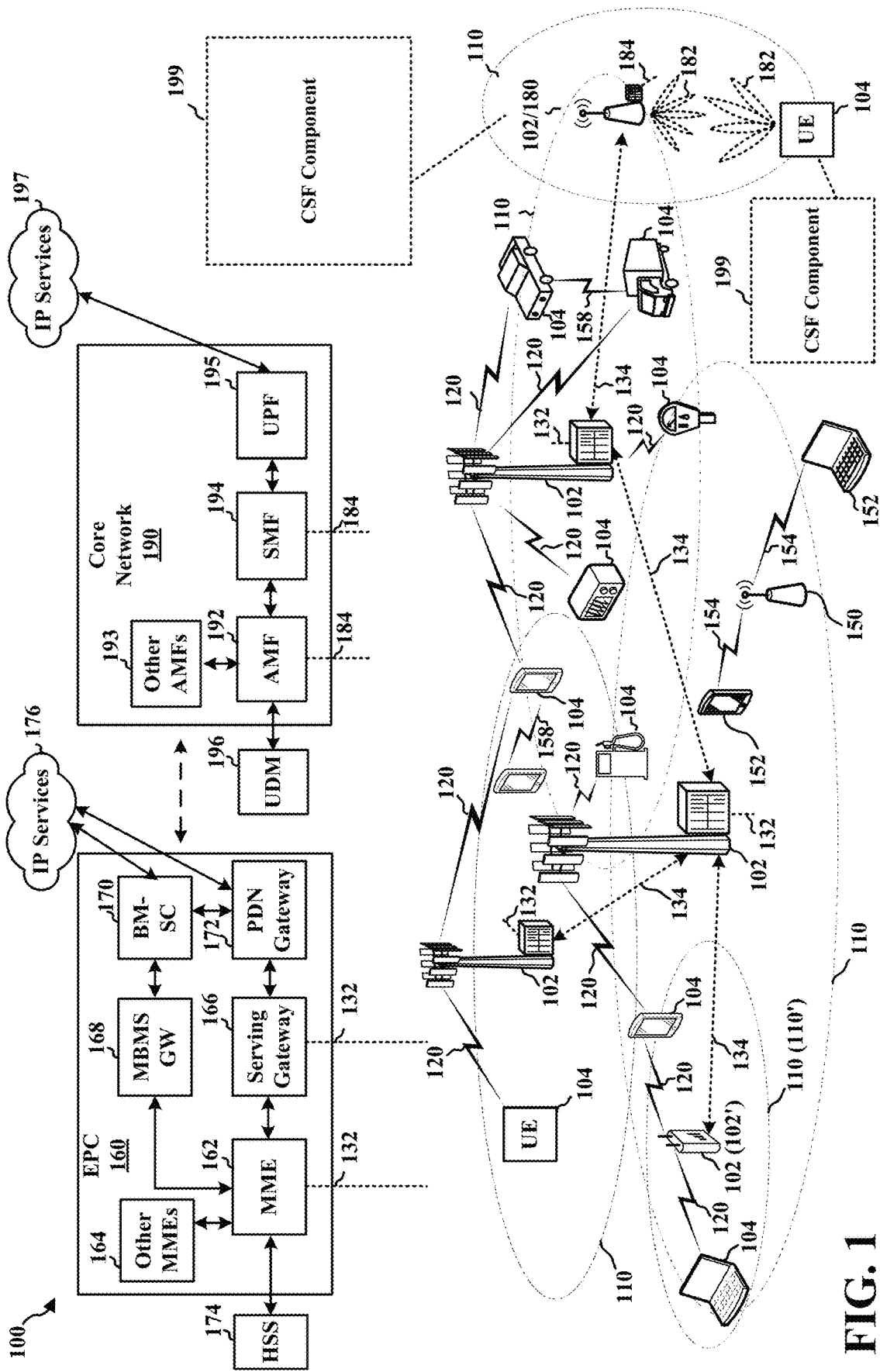
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among others (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among others, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A base station may transmit a channel state information (CSI) reference signal (CSI-RS) that is used by a user equipment (UE) to perform measurements, to estimate a channel based on the measurements, and report channel quality information back to the base station based on the channel estimation. The reported information may be referred to as channel state information feedback (CSF). The UE may report the CSF including, for example, a channel quality indicator (CQI), a rank indicator (RI), and a precoding matrix indicator (PMI), based on the measured CSI-RS resources.

The UE may experience similar scattering and rank distribution for uplink and downlink communications for frequency division duplex (FDD) communications with a relatively small duplex separation. Aspects presented herein improve CSF for FDD communication and enable the UE to further provide dissimilarity information about multiple, associated CSI-RS through a precoded SRS.

As presented herein, a base station may transmit a first CSI-RS on a first set of beams and a second CSI-RS on a second set of beams. A UE may determine a CQI, an RI, and a PMI based on the first CSI-RS and report the CSI and RI to the base station. The UE may indicate the PMI to the base station using a precoded sounding reference signal (SRS). For example, the UE may determine a dissimilarity between the first CSI-RS and the second CSI-RS and may further indicate the dissimilarity to the base station based on the precoding of the SRS. The base station may use the CQI, the RI, the PMI, and the dissimilarity between the two CSI-RS to improve communication with the UE.

FIG. 1 is a diagram illustrating an example of a wireless communications system and an access network 100 in accordance with aspects presented herein. As illustrated in FIG. 1, a base station 102 or 180 may exchange wireless communication with one or more UEs 104. The communication may be exchanged using beams 182.

The UE 104 in the access network may receive a first CSI-RS on a first set of beams from the base station 102 or 180 and may receive a second CSI-RS on a second set of beams from the base station 102 or 180. The UE 104 may include a CSF component 198 configured to determine a CQI, an RI, and a PMI based on the first CSI-RS. The CSF component 198 may be further configured to report the CQI and the RI using an uplink control channel and to indicate the PMI using a precoded SRS transmission. The precoded SRS transmission may be precoded based on a dissimilarity that the UE 104 determines between the first CSI-RS and the second CSI-RS. The base station 102 or 180 may transmit the first CSI-RS based on a default precoder and may transmit the second CSI-RS based on a non-precoded SRS received from the UE 104. The base station 102 or 180 may include a CSF component 199 configured to receive a report of CQI and RI based on the first CSI-RS in an uplink control channel from a UE and to determine a PMI based on a precoded SRS received from the UE. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (such as, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as, S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as, through the EPC 160 or core network 190) with each other over backhaul links 134 (such as, an X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among others) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as, a macro base station), may include an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as, 3 GHz-300 GHz) has extremely high path loss and a short range. The mmW base station 180 may utilize beamforming (such as beams 182) with the UE 104 to compensate for the extremely high path loss and short range.

The base station 180 may transmit a beamformed signal to the UE 104 in one or more transmit directions (such as the beams 182). The UE 104 may receive the beamformed signal from the base station 180 in one or more receive directions (such as beams 182). The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as, an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as, a parking meter, a gas pump, a toaster, a vehicle, a heart monitor, among others). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A, 2B, 2C, and 2D are diagrams illustrating examples of a first NR frame, downlink channels within an NR subframe, a second NR frame, and uplink channels within an NR subframe, respectively. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 ρs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
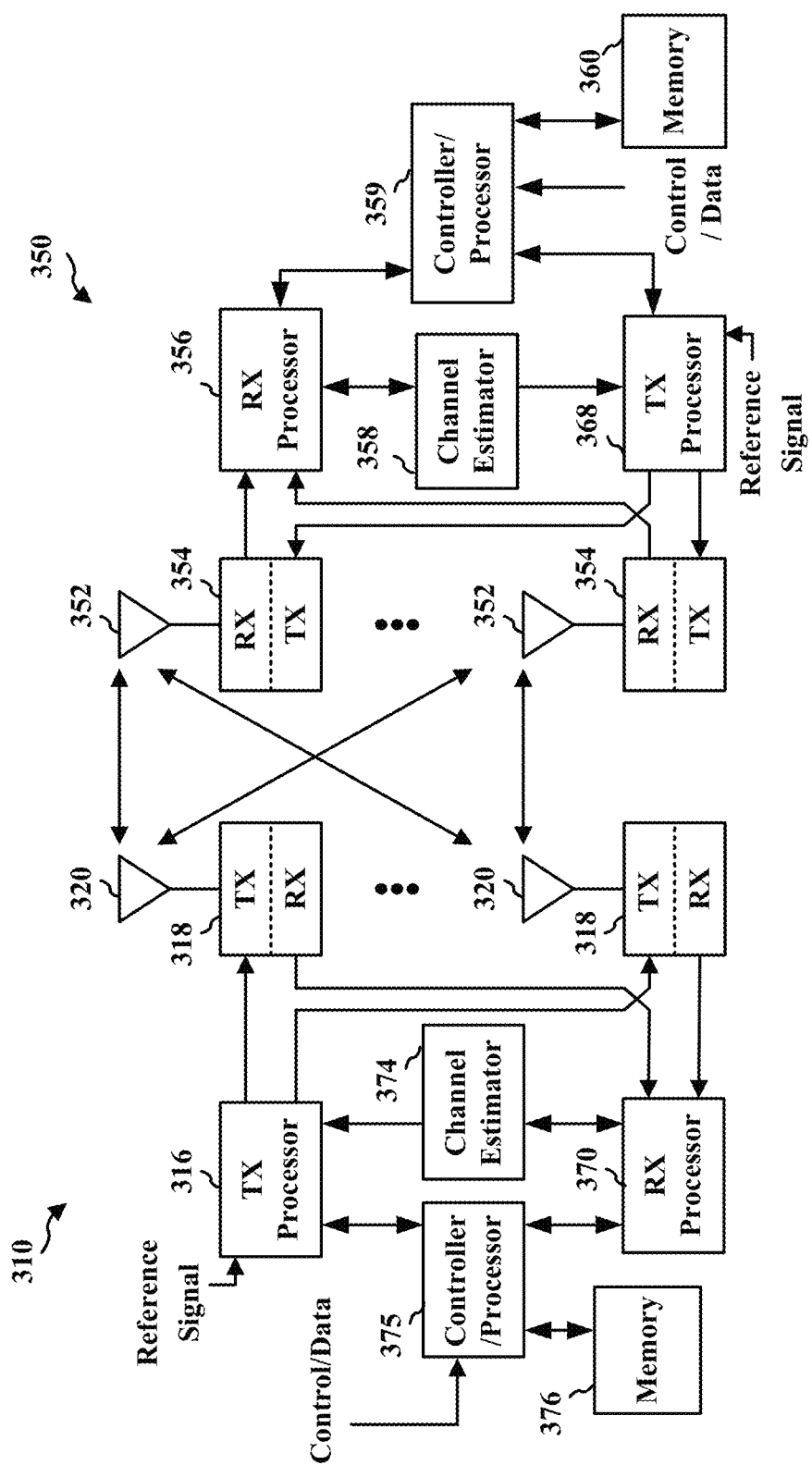
FIG. 3 is a diagram illustrating an example of a base station and user equipment (UE) in an access network.

FIG. 3 is a diagram illustrating an example of a base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the CSF component 199 in FIG. 1.

At least one of the TX processor 316, the RX processor 370, and the controller/processor 375 may be configured to perform aspects in connection with the CSF component 199 in FIG. 1.

CSI-RS is a downlink signal transmitted by a base station. A UE receives the CSI-RS and uses the CSI-RS to estimate a channel and report channel quality information back to the base station. The base station may configure a CSI resource configuration for the UE that indicates a type of the CSI-RS reference signals that are transmitted by the base station for measurement by the UE. For example, the type of reference signal may include a non-zero power (NZP) CSI-RS resource or a channel state information interference measurement (CSI-IM) resource. The base station may configure the CSI resource configuration with an indication of a type of the resources, such as a periodic, aperiodic, or semi-persistent type of CSI resource. The CSI report configuration may indicate to the UE the CSI resource configuration(s) that are to be used for the CSI measurements by the UE.

Figure 4:
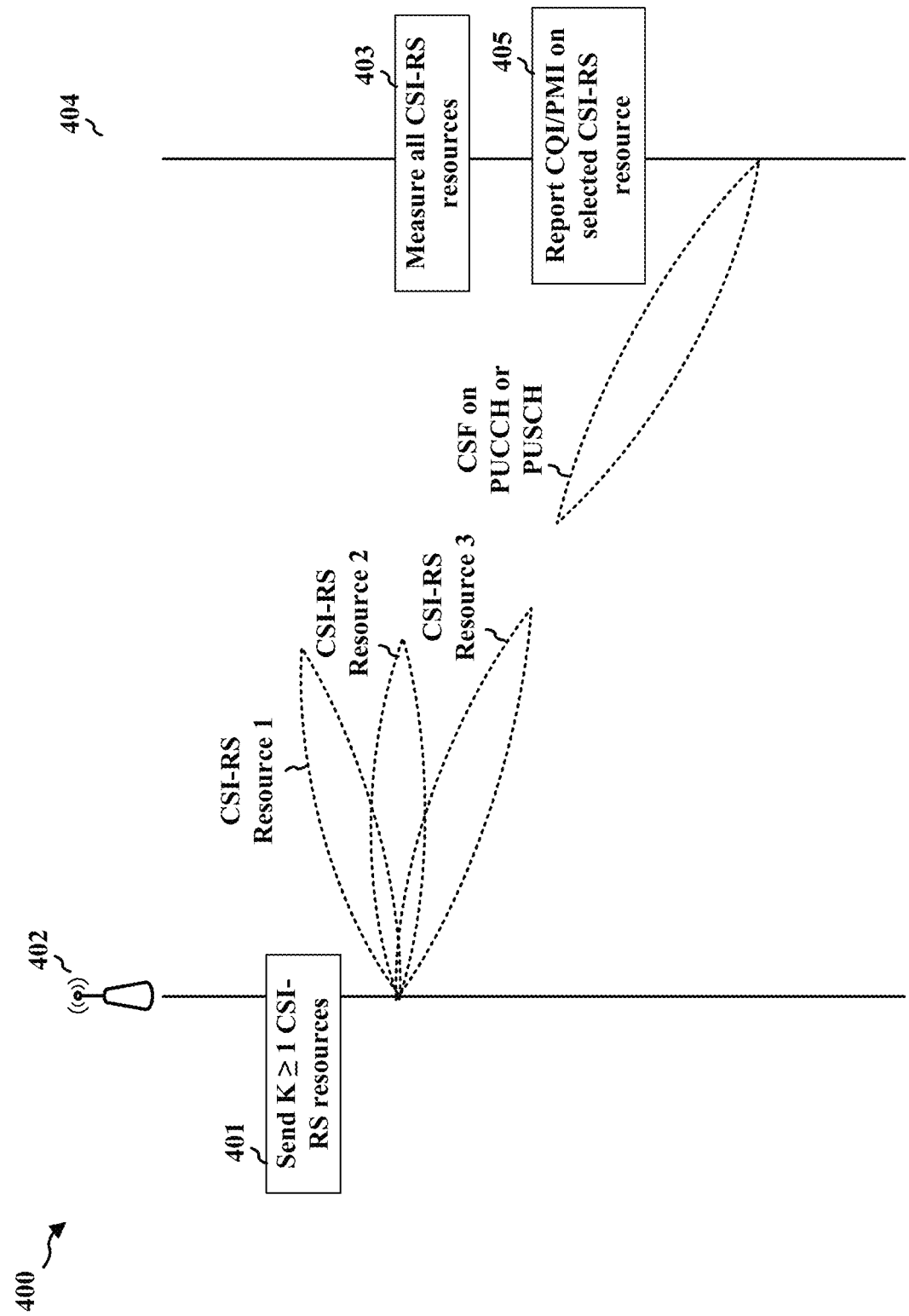
FIG. 4 illustrates an example communication flow for channel state information feedback (CSF) between a UE and a base station.

FIG. 4 illustrates an example communication flow 400 for CSF between a UE 404 and a base station 402 in accordance with aspects presented herein. The base station 402 transmits multiple CSI-RS resources at 401, for example, CSI-RS resource 1, CSI-RS resource 2, CSI-RS resource 3, and so forth. The base station 402 may transmit each CSI-RS using a set of beams. The base station may use a set of beams the includes a single beam or multiple beams. As illustrated at 403, the UE 404 receives and measures each of the CSI-RS resources, for example, CSI-RS resource 1, CSI-RS resource 2, and CSI-RS resource 3. The UE 404 determines, or calculates, the CSI to report to the base station 402. The CSI may include a CQI or a PMI that the UE 404 determines based on the measured CSI-RS resources. Then, at 405, the UE 404 reports the CQI or PMI to the base station using a selected CSI-RS resource. The report may be referred to as a CSF report. The UE 404 may transmit the CSF report on a PUCCH or a PUSCH.

Aspects presented herein improve the CSF process or report by adjusting the manner in which a base station transmits CSI-RS or the manner in which the UE provides the CSF.

For frequency division duplex (FDD) communication, uplink and downlink bands may be located on different frequencies. Wireless communication with a bandwidth part may be performed within a limited frequency spectrum. For FDD communication with a relatively small duplex separation, such as less than 5 MHz or 10 MHz, the UE may experience similar scattering and a similar rank distribution for uplink and downlink communication with the base station. Scattering occurs when a size of an obstacle for a wireless signal is smaller than a wavelength of the radio wave. If the frequency separation for an uplink band and a downlink band is relatively small, such as less than 5 MHz or less than 10 MHz, then the same obstacles may lead to scattering for both downlink and uplink signals. As well, multipath radio waves due to scatters may achieve a higher rank. If the downlink and the uplink signals experience similar scatters, then a similar rank distribution may apply, as well. Aspects presented herein improve the efficiency of the CSF process and enable the UE to provide dissimilarity information to the base station.

Figure 5:
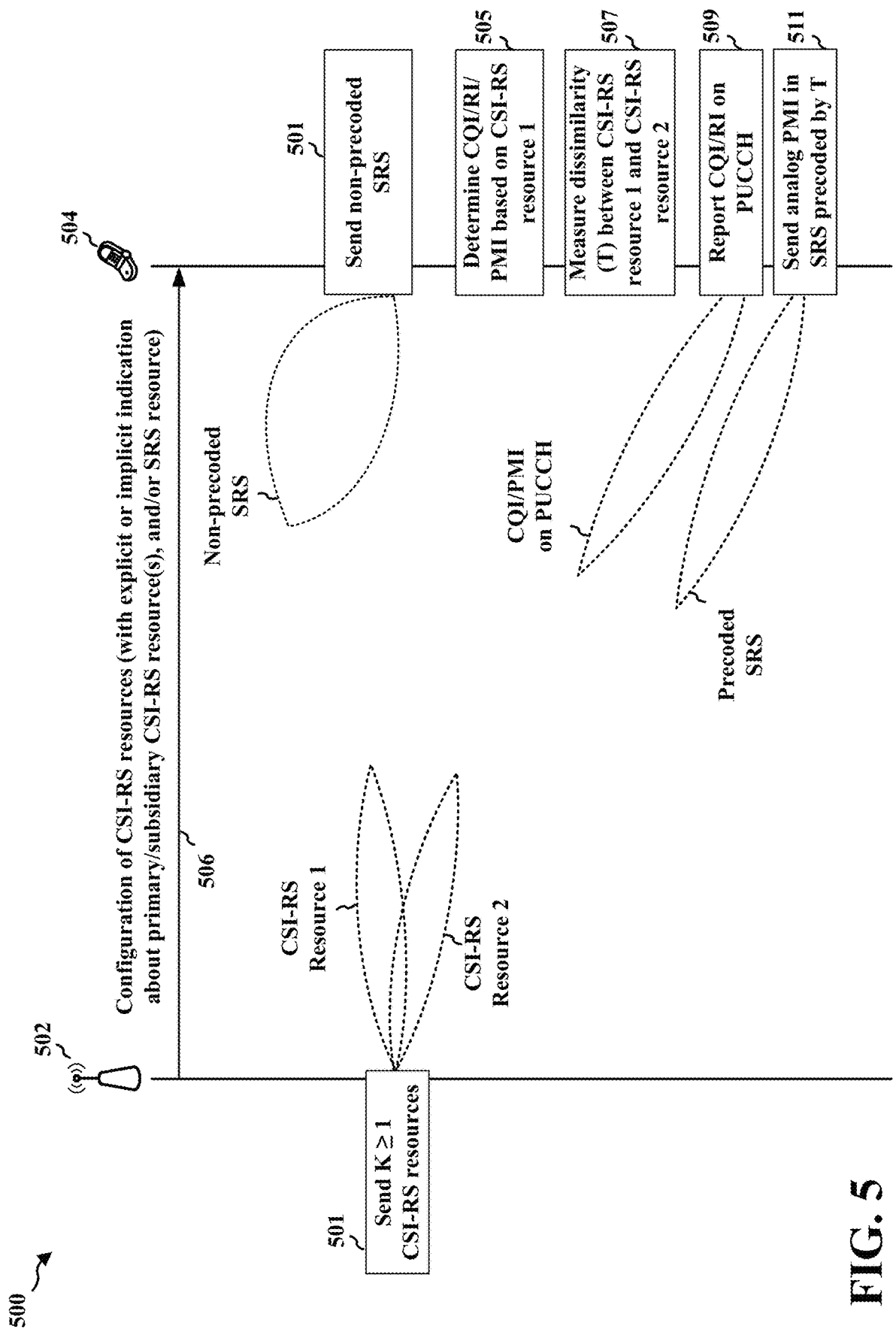
FIG. 5 illustrates an example communication flow for CSF between a UE and a base station in accordance with aspects presented herein.

FIG. 5 illustrates an example communication flow 500 for CSF between a UE 504 and a base station 502 in accordance with aspects presented herein. The base station may jointly transmit, at 503, two sets of CSI-RS resources using different precoders. For example, the base station 502 may precode a CSI-RS resource 1 with a default precoder and may precode a second CSI-RS resource 2 with a different precoder, such as based on measurements about the UE 504. For example, the UE 504 may transmit a non-precoded SRS, at 501. The SRS is an uplink signal transmitted by the UE 504 to help the base station 502 obtain the CSI. The CSI may provide information about how the signal from the base station 502 propagates from the UE 504 to the base station 502. The SRS may represent effects on the signal, such as due to scattering, fading, power decay with distance, among other examples The base station 502 may perform an uplink channel estimation for the non-precoded SRS and use the uplink channel estimation to determine the precoder for CSI-RS resource 2.

Thus, one set of CSI-RS, for example CSI-RS resource 1, may be transmitted with a defined precoder B, $SVD(H_{DL}B) = U_{DL}D_{DL}V_{DL}^H$. In this example, SVD may correspond to Singular Value Decomposition, $H_{DL}$ corresponds to the downlink channel, $U_{DL}$ corresponds to left singular vectors of $H_{DL}B$_, $D_{DL}$ corresponds to singular values of $H_{DL}B$, and $V_{DL}^H$ corresponds to right singular vectors of $H_{DL}B$ which can be regarded as a PMI for the downlink channel. The other set of CSI-RS may be transmitted with a precoder $BU_{UL}$ where $U_{UL}$ is $SVD(B^H\tilde{H}_{UL}) = U_{UL}D_{UL}V_{UL}^H$. $\tilde{H}_{UL}$ is the estimated UL channel from non-precoded SRS, transmitted at 501, and $\tilde{H}_{UL} = \ddot{U}_{UL}\ddot{D}_{UL}\ddot{V}_{UL}^H$. $U_{UL}$ corresponds to left singular vectors of $B^H\tilde{H}_{UL}$, $D_{UL}$ corresponds to singular values of $B^H\tilde{H}_{UL}$, and $V_{UL}^H$ corresponds to right singular vectors of $B^H\tilde{H}_{UL}$. $\ddot{U}_{UL}$ corresponds to left singular vectors of $\tilde{H}_{UL}$, $\ddot{D}_{UL}$ corresponds to singular values of $\tilde{H}_{UL}$, and $\ddot{V}_{UL}^H$ corresponds to a PMI for the right singular vectors of $H_{UL}$.

The UE 504 may measure the first set of CSI-RS (for example, CSI-RS resource 1) and may use the first set of CSI-RS to calculate information such as CQI, RI, or PMI (for example, $V_{DL}^H$), as illustrated at 505. At 507, the UE 504 may measure the dissimilarity (T) between the two CSI-RS resources (for example, between CSI-RS resource 1 and CSI-RS resource 2). For example, the UE 504 may derive $\tilde{U}_{UL} = (H_{DL}B)^\dagger(H_{DL}BU_{UL})$ based on the measurement of two sets of CSI-RS and generate $T = V_{DL}^H\tilde{U}_{UL}$. $\tilde{U}_{UL}$ corresponds to estimated left singular vectors of $B^H\tilde{H}_{UL}$, and $(\cdot)^\dagger$ is a pseudo-inverse operation. The UE 504 may measure the precoder dissimilarity from $(H_{DL}BU_{UL})$, for example, the UE 504 may derive $T = V_{DL}^HU_{UL}$ according to SVD $(H_{DL}BU_{UL}) = U_{DL}D_{DL}(U_{UL}^HV_{DL})^H$.

The UE 504 may send an analog PMI, for example, $V_{DL}$, in the form of an SRS precoded by T. Thus, at 511, the UE 504 may transmit a precoded SRS that is precoded based on the dissimilarity T determined between the CSI-RS resource precoded with a default precoder and the CSI-RS resources precoded based on the uplink channel estimated of the UE's non-precoded SRS. The UE may report the CQI and the RI on a PUCCH at 509. Thus, the base station 502 may determine the CQI and the RI from the received PUCCH and may determine the PMI from the precoded SRS received from the UE 504. The base station 502 may derive $\tilde{T} = (\tilde{H}_{UL})^\dagger(\tilde{H}_{UL}T)$, where $\tilde{T}$ corresponds to estimated precoder of received SRS. The base station 502 can then derive the PMI, for example, $\tilde{V}_{DL} = (\tilde{T}U_{UL}^H)^H$. As another example, the base station 502 may first derive an intermediate variable that can be used to derive the final precoder $P = \ddot{V}_{UL}^HV_{DL}^HU_{UL}$ based on received precoded SRS, for example, $SVD(\tilde{H}_{UL}T) = SVD(\tilde{H}_{UL}V_{DL}^HU_{UL}) = \ddot{U}_{DL}\ddot{D}_{UL}(U_{UL}^HV_{DL}\ddot{V}_{UL})^H$. Then, the base station 502 can derive $\tilde{V}_{DL} = (\tilde{V}_{UL}PU_{UL}^H)^H$. Thus, the UE 502 may convey PMI, $V_{DL}^H$, to the base station 502 by the SRS through analog feedback. Thus, aspects presented herein provide for an analog CSF for FDD partial reciprocity.

Aspects presented herein may further improve the manner in which CSI-RS resources are configured. Each report setting for CSI-RS may be associated with a single downlink BWP and may contain the parameters to indicate that the report setting is for FDD analog CSF. Each CSI resource setting may be linked to the report setting for channel measurement (for FDD analog CSF) may configure at least two CSI-RS resources. For each CSI reporting setting, multiple resource settings (1, 2 or 3) may be configured. For CSI acquisition, there may be 2 or 3 resource settings. One resource may be configured for channel measurement and one or two resources may be configured for interference measurement. Aspects presented herein may involve the resource configuration for channel measurement. The manner in which the CSI-RS resources are configured for channel measurement may depend on the resource setting for interference measurement.

For an aperiodic CSI-RS resource setting, if the interference measurement is performed on NZP CSI-RS or CSI-IM, each CSI resource setting may contain a configuration of a list of S=2 CSI-RS resource sets, each of the two resource sets being configured with one CSI-RS resource. If the interference measurement is performed on NZP CSI-RS or CSI-IM, each CSI-RS resource setting may contain a configuration that is limited to S=1 (for example, a single CSI-RS resource set). Aperiodic resource sets may be associated with a trigger state. The base station 502 may configure a bitmap for the UE 504, such as in RRC signalling. In the bitmap, a bitwidth $N_{bit}$ may equal a number of resource sets in a resource setting. A number of one(s) in the bitmap $N_{one}$ may be equal to ½, 1 or 2 for FDD analog CSF.

For a periodic or semi-persistent CSI resource setting, the number of configured CSI-RS resource sets may be limited to S=1 (for example, a single CSI-RS resource set). This single CSI-RS resource set may be configured with two CSI-RS resources. Alternately, the CSI-RS resource sets may be based on S=2 each with a single CSI-RS resource.

The UE 504 may receive or infer additional information regarding the two CSI-RS resources for channel measurement. For example, the two configured CSI-RS resources for channel measurement may be associated. One of the CSI-RS resources (for example, CSI-RS resource 1) may be a primary CSI-RS resource. The UE 504 may calculate CQI/RI and PMI conditioned on the primary CSI-RS resource.

The other CSI-RS resource (for example, CSI-RS resource 2) may be a subsidiary CSI-RS resource that is used by the UE 504 for determining a dissimilarity measurement. The dissimilarity measurement may include a spatial domain transmission filter T calculation that may be used by the UE 504 for conveying PMI through a target SRS resource, such as by precoding the SRS based on the measured dissimilarity between the two CSI-RS.

The base station 502 may explicitly indicate the primary CSI-RS resource or the subsidiary CSI-RS resource to the UE 504. The explicit indication may be included in configuration information for the primary CSI-RS or the subsidiary CSI-RS resource, such as illustrated at 506. In another example, the UE 504 may determine the primary CSI-RS resource or the subsidiary CSI-RS resource based on implicit information from the base station 502. The implicit indication may be included in configuration information for the primary CSI-RS or the subsidiary CSI-RS resource, for example, as illustrated at 506. For example, the primary CSI-RS resource may have the corresponding report quantity configurations configured (such as CQI, RI, PMI), whereas the subsidiary CSI-RS resource may have the report quantities configured as "none". The UE 504 may identify the primary CSI-RS resource and the subsidiary CSI-RS resource based on whether or not the corresponding report quantity configuration are configured. The UE 504 may also identify the primary CSI-RS resource or the subsidiary CSI-RS resource based on other implicit information.

In addition to identifying which CSI-RS resource is the primary CSI-RS resource and which is the subsidiary CSI-RS resource, the UE 504 may also determine an association between the CSI-RS resource and the subsidiary CSI-RS resource. The association between the CSI-RS resources may be configured in the configuration of the primary CSI-RS resource or in the configuration of the subsidiary CSI-RS resource, for example as illustrated at 506.

The UE 504 may identify the SRS resource to use to indicate the PMI to the base station. The UE 504 may receive information from the base station that is used to determine an association between the SRS resource for sending analog PMI and the subsidiary CSI-RS resource. For example, the association between the subsidiary CSI-RS resource and the SRS resource for sending the precoded SRS may be configured in either subsidiary CSI-RS resource configuration or the SRS resource configuration, for example, as illustrated at 506.

Figure 6:
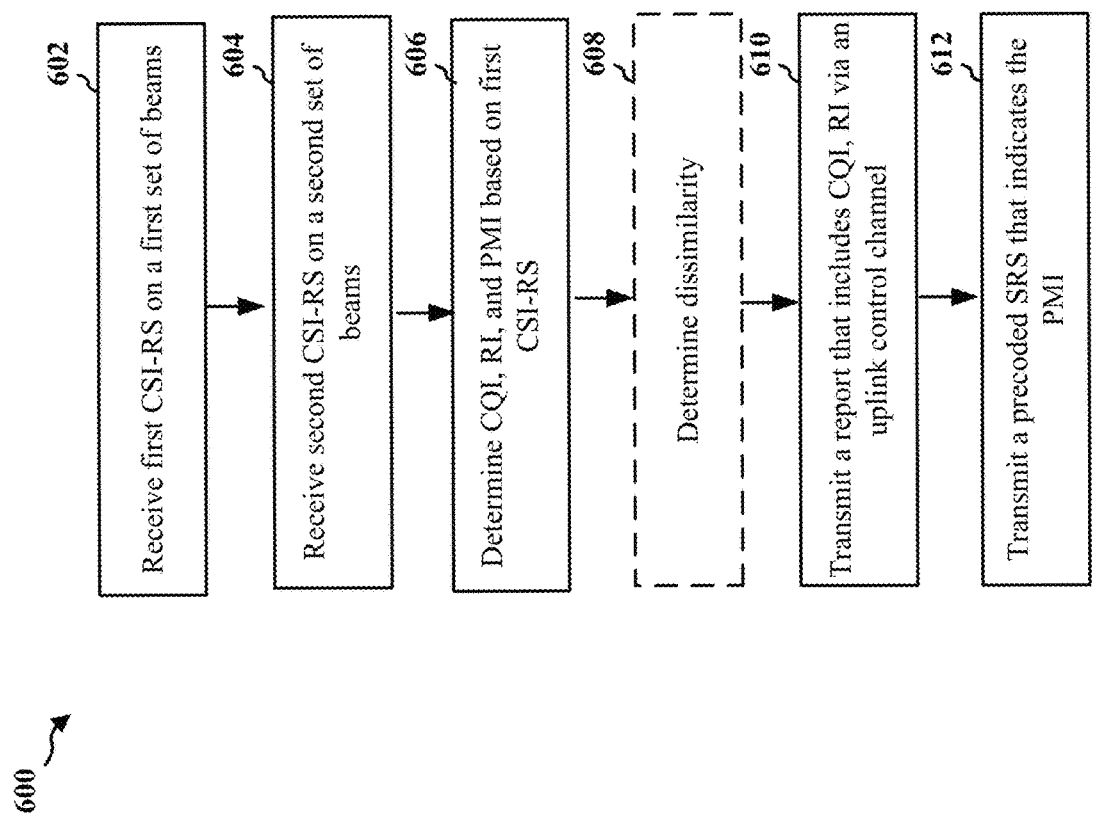
FIG. 6 is a flowchart of a method of wireless communication including CSF in accordance with aspects presented herein.

FIG. 6 is a flowchart 600 of a method of wireless communication including CSF in accordance with aspects presented herein. method may be performed by a UE or a component of a UE (such as the UE 104, 350, 504; the apparatus 702, which may include the memory 360 and which may be an entire UE 350 or a component of the UE 350, such as the TX processor 368, the RX processor 356, or the controller/processor 359). Optional aspects are illustrated with a dashed line. The method may improve the manner in which a UE measures and provides CSF.

At 602, the UE receives a first CSI-RS on a first set of beams. The first set of beams may include multiple beams. The first set of beams may include a single beam. The first CSI-RS may correspond to CSI resource 1 in FIG. 5. For example, first CSI-RS component 740 of the apparatus 702 may receive the first CSI-RS.

At 604, the UE receives a second CSI-RS on a second set of beams. The second set of beams may include multiple beams. The second set of beams may include a single beam. The second CSI-RS may correspond to CSI resource 2 in FIG. 5. For example, second CSI-RS component 742 of the apparatus 702 may receive the second CSI-RS.

At 606, the UE determines a CQI, a RI, and a PMI based on the first CSI-RS. The UE may determine additional CSI based on the first CSI-RS. For example, the UE may determine at least one of the CQI, RI, and PMI on the first CSI-RS and not on the second CSI-RS. For example, CSI component 744 of the apparatus 702 may determine the CQI, RI, and PMI based on the first CSI-RS.

At 610, the UE transmits a report the CQI and the RI. The CQI and RI may be reported to the base station via an uplink control channel. For example, the report component 746 of the apparatus 702 may report the CQI and RI determined by the CQI component 744 based on the first CSI-RS.

At 612, the UE transmits a precoded SRS transmission that indicates the PMI. Thus, the PMI is reported separately from the CQI and RI and is reported in a different manner than the CQI and RI. For example, SRS component 750 or precode component 752 of the apparatus 702 may indicate the PMI using a precoded SRS. As illustrated at 608, the UE may determine a dissimilarity between the first CSI-RS and the second CSI-RS. The dissimilarity may be determined, such as described in connection with 507 in FIG. 5. For example, dissimilarity component 748 of the apparatus 702 may determine the dissimilarity between the first and second CSI-RS. The UE may then precode an SRS transmission to generate the precoded SRS transmission based on the dissimilarity determined between the first CSI-RS and the second CSI-RS to indicate the PMI. For example, precode component 752 of the apparatus 702 may precode the SRS. As described in connection with 507 and 511, the SRS may indicate an FDD analog PMI through its decoding based on T.

The UE may transmit a non-precoded SRS prior to receiving the first CSI-RS and the second CSI-RS. For example, SRS component 750 of the apparatus 702 may transmit the unprecoded SRS. The first CSI-RS, received at 602, may be associated with a defined precoder, for example, may be precoded by defined precoder B. The second CSI-RS may be associated with a precoder based at least in part on an uplink channel estimate of the non-precoded SRS that is transmitted by the UE.

A reporting setting configured for the UE may include a parameter indicating that the report setting is for FDD analog CSF. The UE may receive an indication regarding the type of CSI-RS. For example, the UE may receive an indication of aperiodic CSI-RS resource sets for the first CSI-RS and the second CSI-RS that are associated with a trigger state. The indication may be received by the resource set component 754, and provided to the first CSI-RS component 740 and the second CSI-RS component 742. The aperiodic CSI-RS resource sets for the first CSI-RS and the second CSI-RS may be indicated in a bitmap received in an RRC message. If interference measurement is performed on NZP CSI-RS signals or on CSI-IM, each CSI resource setting for channel measurement may include two CSI-RS resource sets, and each of the two CSI-RS resource sets may be configured with a single CSI-RS resource. For example, the UE may further perform the interference measurement based on the on NZP CSI-RS signals or on CSI-IM, each CSI resource setting for channel measurement including two CSI-RS resource sets. The UE may receive a configuration of each of the two CSI-RS resource sets with a single CSI-RS resource. If interference measurement is performed on NZP CSI-RS or CSI-IM signals, each CSI resource setting for channel measurement may include a single CSI-RS resource set configured with two CSI-RS resources. For example, the UE may further perform the interference measurement based on NZP CSI-RS or CSI-IM signals, each CSI resource setting for channel measurement including a single CSI-RS resource set configured with two CSI-RS resources. The UE may receive a configuration of the two CSI-RS resources, each CSI-RS resource including two CSI-RS resources.

The UE may receive an indication of a single periodic or semi-persistent CSI-RS resource set for the first CSI-RS and the second CSI-RS, where the single periodic or semi-persistent CSI-RS resource set is configured with two CSI-RS resources. The indication may be received by the resource set component 754, and provided to the first CSI-RS component 740 and the second CSI-RS component 744.

The two CSI-RS resources may include a primary CSI-RS resource and a subsidiary or secondary CSI-RS resource. For example, the first CSI-RS may include a primary CSI-RS resource that is used by the UE for determining the CQI, the RI, and the PMI. The second CSI-RS may include a subsidiary CSI-RS resource for determining a dissimilarity between the first CSI-RS and the second CSI-RS, such as at 608. The UE may receive an indication that the first CSI-RS is the primary CSI-RS resource or that the second CSI-RS is the subsidiary CSI-RS resource. The UE may receive an explicit indication of the primary/subsidiary CSI-RS resource(s). Alternatively or additionally, the UE may receive an implicit indication of the primary/subsidiary CSI-RS resource(s). The indication, whether explicit or implicit, may be received by the resource set component 754, and provided to the first CSI-RS component 740 and the second CSI-RS component 742. For example, the UE may determine that the first CSI-RS includes the primary CSI-RS resource based on a configuration of a report quantity for the CQI, the RI, and the PMI for the first CSI-RS. The UE may determine that the second CSI-RS includes the subsidiary CSI-RS resource based on a report quantity for the CQI, the RI, and the PMI not being configured for the second CSI-RS, such as being configured as "none."

The UE may receive an indication of an association between the primary CSI-RS resource and the subsidiary CSI-RS resource, where the association indication is received in at least one of a first configuration for the primary CSI-RS resource or a second configuration for the subsidiary CSI-RS resource. The indication of an association may be received by the association component 756 of the apparatus 702. The UE may receive an indication of an association between the subsidiary CSI-RS resource and an SRS resource for the precoded SRS transmission, where the indication is received in at least one of a first configuration for the primary CSI-RS resource or a second configuration for the subsidiary CSI-RS resource. The UE may determine the SRS resource for transmitting the precoded SRS, at 612, based on the indication of the association between the CSI-RS resource(s) and the SRS resource.

Various aspects of the flowchart 600 may be performed in a different order than the visual depiction of FIG. 6.

Figure 7:
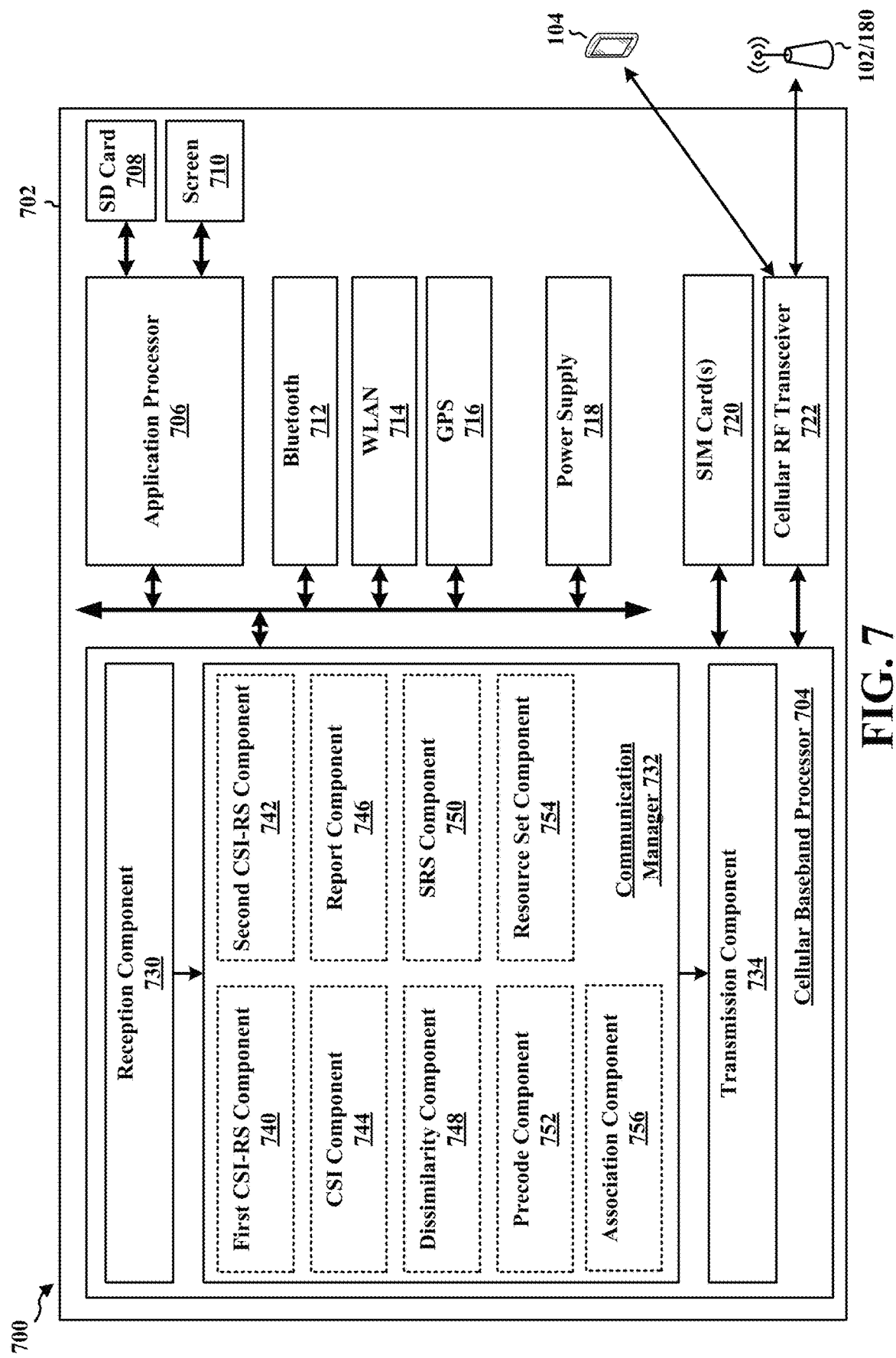
FIG. 7 is a diagram illustrating an example of a hardware implementation for an example apparatus that supports CSF in accordance with aspects presented herein.

FIG. 7 is a diagram 700 illustrating an example of a hardware implementation for an example apparatus 702 that supports CSF in accordance with aspects presented herein. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described herein. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (for example, see 350 of FIG. 3) and include the additional modules of the apparatus 702.

The communication manager 732 includes a first CSI-RS component 740 configured to receive a first CSI-RS on a first set of beams. The communication manager 732 includes a second CSI-RS component 742 configured to receive a second CSI-RS on a second set of beams. The communication manager 732 includes a CSI component 744 configured to determine a CQI, an RI, and a PMI based on the first CSI-RS. The communication manager 732 includes a report component 746 configured to report the CQI and RI using an uplink control channel. The communication manager 732 includes an SRS component 750 or precode component 752 configured to indicate the PMI using a precoded SRS transmission. The communication manager 732 includes a dissimilarity component 748 configured to determine a dissimilarity between the first CSI-RS and the second CSI-RS. The apparatus includes a precode component 752 configured to precode a SRS transmission to generate the precoded SRS transmission based on the dissimilarity determined between the first CSI-RS and the second CSI-RS to indicate the PMI. The communication manager 732 includes an SRS component 750 configured to transmit a non-precoded SRS prior to receiving the first CSI-RS and the second CSI-RS. The communication manager 732 may include a resource set component 754 configured to receive information about resource set(s) for the first and second CSI-RS. For example, resource set component 754 may be configured to receive an indication of aperiodic CSI-RS resource sets for the first CSI-RS and the second CSI-RS that are associated with a trigger state. The resource set component 754 may be configured to receive an indication of a single periodic or semi-persistent CSI-RS resource set for the first CSI-RS and the second CSI-RS, where the single periodic or semi-persistent CSI-RS resource set is configured with two CSI-RS resources. The resource set component 754 may be configured to receive an indication for at least one of the first CSI-RS as the primary CSI-RS resource or the second CSI-RS as the subsidiary CSI-RS resource. The communication manager 732 may include association component 756 configured to receive an association regarding the CSI-RS resource(s) or the SRS resource. For example, the association component 756 may be configured to receive an indication that indicates an association between the primary CSI-RS resource and the subsidiary CSI-RS resource, where the association indication is received in at least one of a first configuration for the primary CSI-RS resource or a second configuration for the subsidiary CSI-RS resource. The association component 756 may be configured to receive an indication of an association between the subsidiary CSI-RS resource and an SRS resource for the precoded SRS transmission, where the indication is received in at least one of a first configuration for the primary CSI-RS resource or a second configuration for the subsidiary CSI-RS resource.

The apparatus 702 may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular, the cellular baseband processor 704, includes means for receiving a first CSI-RS on a first set of beams and means for receiving a second CSI-RS on a second set of beams. The apparatus 702 includes means for determining a CQI, an RI, and a PMI based on the first CSI-RS. The apparatus 702 includes means for reporting the CQI and RI using an uplink control channel. The apparatus 702 includes means for indicating the PMI using a precoded SRS transmission. The apparatus 702 includes means for determining a dissimilarity between the first CSI-RS and the second CSI-RS. The apparatus 702 may include means for precoding a SRS transmission to generate the precoded SRS transmission based on the dissimilarity determined between the first CSI-RS and the second CSI-RS to indicate the PMI. The apparatus 702 may include means for transmitting a non-precoded SRS prior to receiving the first CSI-RS and the second CSI-RS. The apparatus 702 may include means for receiving an indication of aperiodic CSI-RS resource sets for the first CSI-RS and the second CSI-RS that are associated with a trigger state. The apparatus 702 may include means for receiving an indication of a single periodic or semi-persistent CSI-RS resource set for the first CSI-RS and the second CSI-RS, where the single periodic or semi-persistent CSI-RS resource set is configured with two CSI-RS resources. The apparatus 702 may include means for receiving an indication for at least one of the first CSI-RS as the primary CSI-RS resource or the second CSI-RS as the subsidiary CSI-RS resource. The apparatus 702 may include means for receiving an association indication that indicates an association between the primary CSI-RS resource and the subsidiary CSI-RS resource, where the association indication is received in at least one of a first configuration for the primary CSI-RS resource or a second configuration for the subsidiary CSI-RS resource. The apparatus 702 may include means for receiving an indication of an association between the subsidiary CSI-RS resource and an SRS resource for the precoded SRS transmission, where the indication is received in at least one of a first configuration for the primary CSI-RS resource or a second configuration for the subsidiary CSI-RS resource. The means may be one or more of the aforementioned components of the apparatus 702 configured to perform the functions recited by the aforementioned means. As described herein, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
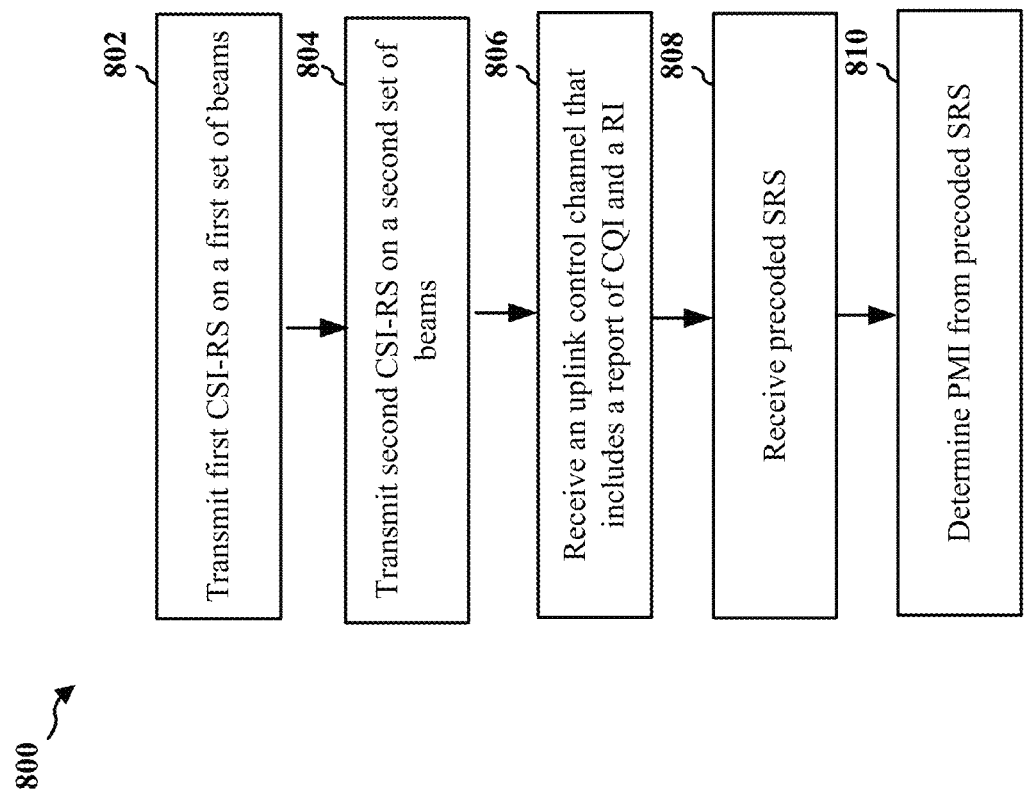
FIG. 8 is a flowchart of a method of wireless communication including CSF in accordance with aspects presented herein.

FIG. 8 is a flowchart 800 of a method of wireless communication including CSF in accordance with aspects presented herein. The method may be performed by a base station or a component of a base station (such as the base station 102, 180, 310, 502; the apparatus 902, which may include the memory 376 and which may be the entire base station 310 or a component of the base station 310, such as the TX processor 316, the RX processor 370, or the controller/processor 375). The method may improve the manner in which a base station transmits CSI-RS and receives CSF.

At 802, the base station transmits a first CSI-RS on a first set of beams. The first set of beams may include multiple beams. The first set of beams may include a single beam. The first CSI-RS may correspond to CSI resource 1 in FIG. 5. For example, first CSI-RS component 940 of apparatus 902 may transmit the first CSI-RS.

At 804, the base station transmits a second CSI-RS on a second set of beams. The second set of beams may include multiple beams. The second set of beams may include a single beam. The second CSI-RS may correspond to CSI resource 2 in FIG. 5. For example, second CSI-RS component 942 of apparatus 902 may transmit the second CSI-RS.

At 806, the base station may receive an uplink control channel from a UE that includes a report of the CQI and RI. The CQI and RI may be measured by the UE based on the first CSI-RS. For example, report component 946 of apparatus 902 may receive report the CQI and RI determined based on the first CSI-RS.

At 808, the base station may receive a precoded SRS from the UE. At 922, the base station may determine a PMI for the UE based on the precoded SRS from the UE. Thus, the PMI may be received separately from the CQI and RI and may be received in a different manner than the CQI and RI. For example, SRS component 948 or PMI component 944 of apparatus 902 may determine the PMI based on a precoded SRS. As described in connection with 618 and 507, the SRS may be precoded based on a dissimilarity measured at the UE between the first CSI-RS and the second CSI-RS. As described in connection with 507 and 511, the SRS may indicate an FDD analog PMI through its decoding based on T.

The base station may a non-precoded SRS prior to transmitting the first CSI-RS and the second CSI-RS. For example, SRS component 948 of apparatus 902 may receive the unprecoded SRS. The first CSI-RS, transmitted at 802, may include a defined precoder, for example, may be precoded by defined precoder B. The second CSI-RS may include a precoder based at least in part on an uplink channel estimate of the non-precoded SRS that is determined by the base station.

A reporting setting configured for the UE may include a parameter indicating that the report setting is for FDD analog CSF. The base station may transmit an indication regarding the type of CSI-RS. For example, the base station may transmit an indication of aperiodic CSI-RS resource sets for the first CSI-RS and the second CSI-RS that are associated with a trigger state. The indication may be transmitted by resource set component 952. The aperiodic CSI-RS resource sets for the first CSI-RS and the second CSI-RS may be indicated in a bitmap received in an RRC message. If interference measurement is performed on NZP CSI-RS signals or CSI-IM signals, each CSI resource setting for channel measurement may include two CSI-RS resource sets, and each of the two CSI-RS resource sets may be configured with a single CSI-RS resource. For example, the base station may configure two CSI-RS resource sets each having a single CSI-RS resource for the interference measurement to be performed on NZP CSI-RS signals or CSI-IM signals, each CSI resource setting for channel measurement may include two CSI-RS resource sets. If interference measurement is performed on NZP CSI-RS signals or CSI-IM signals, each CSI resource setting for channel measurement may include a single CSI-RS resource set configured with two CSI-RS resources. For example, the base station may configure a single CSI-RS resource set with two CSI-RS resources for the interference measurement to be performed on the NZP CSI-RS signals or CSI-IM signals.

The base station may transmit an indication of a single periodic or semi-persistent CSI-RS resource set for the first CSI-RS and the second CSI-RS, where the single periodic or semi-persistent CSI-RS resource set is configured with two CSI-RS resources. The indication may be transmitted by resource set component 952.

The two CSI-RS resources may include a primary CSI-RS resource and a subsidiary or secondary CSI-RS resource. For example, the first CSI-RS may include a primary CSI-RS resource that is to be used by the UE for determining the CQI, the RI, and the PMI. The second CSI-RS may include a subsidiary CSI-RS resource to be used by the UE for determining a dissimilarity between the first CSI-RS and the second CSI-RS. The base station may transmit an indication for at least one of the first CSI-RS as the primary CSI-RS resource or the second CSI-RS as the subsidiary CSI-RS resource. The base station may transmit an explicit indication of the primary/subsidiary CSI-RS resource(s). Alternatively or additionally, the base station may transmit an implicit indication of the primary/subsidiary CSI-RS resource(s). The indication, whether explicit or implicit, may be transmitted by resource set component 952. For example, the base station may indicate that the first CSI-RS includes the primary CSI-RS resource based on a configuration of a report quantity for the CQI, the RI, and the PMI for the first CSI-RS. The base station may indicate that the second CSI-RS includes the subsidiary CSI-RS resource based on a report quantity for the CQI, the RI, and the PMI not being configured for the second CSI-RS, such as being configured as "none."

The base station may transmit an indication of an association between the primary CSI-RS resource and the subsidiary CSI-RS resource, where the association indication is transmitted in at least one of a first configuration for the primary CSI-RS resource or a second configuration for the subsidiary CSI-RS resource. The indication of an association may be transmitted by association component 954 of apparatus 902. The base station may transmit an indication of an association between the subsidiary CSI-RS resource and an SRS resource for the precoded SRS transmission, where the indication is received in at least one of a first configuration for the primary CSI-RS resource or a second configuration for the subsidiary CSI-RS resource. The indication may help the UE to determine the SRS resource for transmitting the precoded SRS.

Various aspects of the flowchart 800 may be performed in a different order than the visual depiction of FIG. 8.

Figure 9:
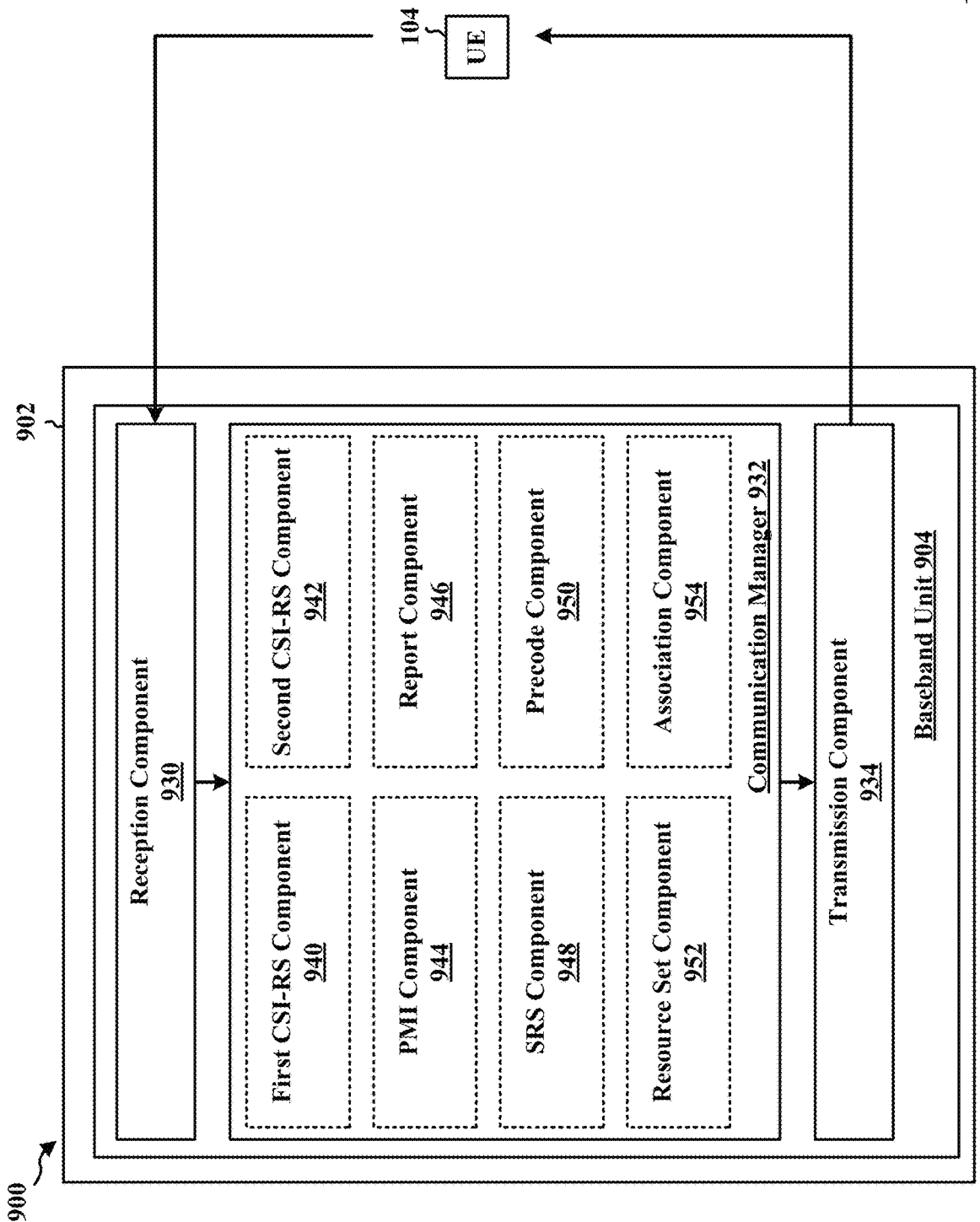
FIG. 9 is a diagram illustrating an example of a hardware implementation for an example apparatus that supports CSF in accordance with aspects presented herein.

FIG. 9 is a diagram 900 illustrating an example of a hardware implementation for an example apparatus 902 that supports CSF in accordance with aspects presented herein. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described herein. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a first CSI-RS component 940 configured to transmit a first CSI-RS on a first set of beams. The communication manager 932 includes a second CSI-RS component 942 configured to transmit a second CSI-RS on a second set of beams. The communication manager 932 includes a report component 946 configured to receive a report of the CQI and RI using an uplink control channel. The communication manager 932 includes an SRS component 948 to receive SRS from the UE, such as a precoded SRS and a non-precoded SRS. The communication manager 932 includes a determination component 944 configured to determine a PMI using a precoded SRS transmission. The communication manager 932 includes a precode component 950 configured to precode a the first and second CSI-RS transmissions. SRS component 948 may be configured to receive a non-precoded SRS prior to transmitting the first CSI-RS and the second CSI-RS. The communication manager 932 may include a resource set component 952 configured to transmit information about resource set(s) for the first and second CSI-RS. For example, resource set component 952 may be configured to transmit an indication of aperiodic CSI-RS resource sets for the first CSI-RS and the second CSI-RS that are associated with a trigger state. The resource set component 952 may be configured to transmit an indication of a single periodic or semi-persistent CSI-RS resource set for the first CSI-RS and the second CSI-RS, where the single periodic or semi-persistent CSI-RS resource set is configured with two CSI-RS resources. The resource set component 952 may be configured to transmit an indication for at least one of the first CSI-RS as the primary CSI-RS resource or the second CSI-RS as the subsidiary CSI-RS resource. The communication manager 932 may include association component 954 configured to transmit an association regarding the CSI-RS resource(s) or the SRS resource. For example, the association component 954 may be configured to transmit an indication that indicates an association between the primary CSI-RS resource and the subsidiary CSI-RS resource, where the association indication is transmitted in at least one of a first configuration for the primary CSI-RS resource or a second configuration for the subsidiary CSI-RS resource. The association component 954 may be configured to transmit an indication of an association between the subsidiary CSI-RS resource and an SRS resource for the precoded SRS transmission, where the indication is transmitted in at least one of a first configuration for the primary CSI-RS resource or a second configuration for the subsidiary CSI-RS resource.

The apparatus 902 may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902 for wireless communication includes means for transmitting a first CSI-RS on a first set of beams. The apparatus 902 includes means for transmitting a second CSI-RS on a second set of beams. The apparatus 902 includes means for receiving a report of a CQI and a RI based on the first CSI-RS, where the report is received in an uplink control channel from a UE. The apparatus 902 includes means for receiving a precoded SRS from the UE. The apparatus 902 includes means for determining a PMI based on the precoded SRS. The apparatus 902 includes means for receiving a non-precoded SRS prior to transmitting the first CSI-RS and the second CSI-RS. The apparatus 902 includes means for determining a precoder for the second CSI-RS based on an uplink channel estimate of the non-precoded SRS received from the UE, where the first CSI-RS is transmitted using a defined precoder. The apparatus 902 includes means for transmitting an indication of aperiodic CSI-RS resource sets for the first CSI-RS and the second CSI-RS that are associated with a trigger state. The apparatus 902 includes means for transmitting an indication of a single periodic or semi-persistent CSI-RS resource set for the first CSI-RS and the second CSI-RS, where the single periodic or semi-persistent CSI-RS resource set is configured with two CSI-RS resources. The apparatus 902 includes means for transmitting, to the UE, an indication for at least one of the first CSI-RS as the primary CSI-RS resource or the second CSI-RS as the subsidiary CSI-RS resource. The apparatus 902 includes means for transmitting an association indication that indicates an association between the primary CSI-RS resource and the subsidiary CSI-RS resource, where the association indication is transmitted in at least one of a first configuration for the primary CSI-RS resource or a second configuration for the subsidiary CSI-RS resource. The apparatus 902 includes means for transmitting an indication of an association between the subsidiary CSI-RS resource and an SRS resource for the precoded SRS, where the indication is transmitted in at least one of a first configuration for the primary CSI-RS resource or a second configuration for the subsidiary CSI-RS resource. The aforementioned means may be one or more of the aforementioned components of the apparatus 902 configured to perform the functions recited by the aforementioned means. As described herein, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative only and aspects thereof may be combined with aspects of other examples or teaching described herein, without limitation.

Example 1 is a method of wireless communication at a UE, comprising: receiving a first CSI-RS on a first set of beams; receiving a second CSI-RS on a second set of beams; determining a CQI, a RI, and a PMI based on the first CSI-RS; transmitting a report that includes the CQI and the RI via an uplink control channel; and transmitting a precoded SRS that indicates the PMI.

In Example 2, the method of Example 1 further includes determining a dissimilarity between the first CSI-RS and the second CSI-RS; and precoding a SRS to generate the precoded SRS transmission based on the dissimilarity determined between the first CSI-RS and the second CSI-RS to indicate the PMI.

In Example 3, the method of Example 1 or Example 2 further includes transmitting a non-precoded SRS prior to receiving the first CSI-RS and the second CSI-RS.

In Example 4, the method of any of Examples 1-3 further includes that the first CSI-RS is associated with a defined precoder, and wherein the second CSI-RS is associated with a precoder based at least in part on an uplink channel estimate of the non-precoded SRS.

In Example 5, the method of any of Examples 1-4 further includes that a reporting setting of the UE for the report comprises a parameter indicating that the report setting is for FDD analog CSF.

In Example 6, the method of any of Examples 1-5 further includes performing interference measurement on NZP CSI-RS signals or on CSI-IM signals, each CSI resource setting for channel measurement comprising two CSI-RS resource sets, wherein each of the two CSI-RS resource sets is configured with a single CSI-RS resource.

In Example 7, the method of any of Examples 1-6 further includes performing an interference measurement on NZP CSI-RS signals or CSI-IM signals, each CSI resource setting for channel measurement comprising a single CSI-RS resource set configured with two CSI-RS resources.

In Example 8, the method of any of Examples 1-7 further includes receiving a RRC message that includes a bitmap including an indication of aperiodic CSI-RS resource sets for the first CSI-RS and the second CSI-RS that are associated with a trigger state.

In Example 9, the method of any of Examples 1-8 further includes receiving an indication of a single periodic or semi-persistent CSI-RS resource set for the first CSI-RS and the second CSI-RS, wherein the single periodic or semi-persistent CSI-RS resource set is configured with two CSI-RS resources.

In Example 10, the method of any of Examples 1-9 further includes that the first CSI-RS comprises a primary CSI-RS resource for determining the CQI, the RI, and the PMI, and wherein the second CSI-RS comprises a subsidiary CSI-RS resource for determining a dissimilarity between the first CSI-RS and the second CSI-RS.

In Example 11, the method of any of Examples 1-10 further includes receiving an indication that indicates the first CSI-RS is the primary CSI-RS resource or that the second CSI-RS is the subsidiary CSI-RS resource.

In Example 12, the method of any of Examples 1-11 further includes that the UE determines that the first CSI-RS comprises the primary CSI-RS resource based on a configuration of a report quantity for the CQI, the RI, and the PMI for the first CSI-RS.

In Example 13, the method of any of Examples 1-12 further includes that the UE determines that the second CSI-RS comprises the subsidiary CSI-RS resource based on a report quantity for the CQI, the RI, and the PMI not being configured for the second CSI-RS.

In Example 14, the method of any of Examples 1-13 further includes receiving an association indication that indicates an association between the primary CSI-RS resource and the subsidiary CSI-RS resource, wherein the association indication is received in at least one of a first configuration for the primary CSI-RS resource or a second configuration for the subsidiary CSI-RS resource, or receiving an indication of an association between the subsidiary CSI-RS resource and an SRS resource for the precoded SRS transmission, wherein the indication is received in at least one of a first configuration for the primary CSI-RS resource or a second configuration for the subsidiary CSI-RS resource.

Example 15 is a device including one or more processors and one or more memories in electronic communication with the one or more processors storing instructions executable by the one or more processors to cause the device to implement a method as in any of Examples 1-14.

Example 16 is a system or apparatus including means for implementing a method or realizing an apparatus as in any of Examples 1-14.

Example 17 is a non-transitory computer readable medium storing instructions executable by one or more processors to cause the one or more processors to implement a method as in any of Examples 1-14.

Example 18 is a method of wireless communication at a base station, comprising: transmitting a first CSI-RS on a first set of beams; transmitting a second CSI-RS on a second set of beams; receiving an uplink control channel from a UE that includes a report of a CQI and a RI based on the first CSI-RS; receiving a precoded SRS from the UE; and determining a PMI based on the precoded SRS.

In Example 19, the method of Example 18 further includes that the precoded SRS is precoded based on a dissimilarity between a measurement of the first CSI-RS and the second CSI-RS at the UE.

In Example 20, the method of Example 18 or Example 19 further includes receiving a non-precoded SRS prior to transmitting the first CSI-RS and the second CSI-RS; and determining a precoder for the second CSI-RS based on an uplink channel estimate of the non-precoded SRS received from the UE, wherein the first CSI-RS is transmitted using a defined precoder.

In Example 21, the method of any of Examples 18-20 further includes that the reporting setting of the UE for the report comprises a parameter indicating the report setting is for FDD analog CSF.

In Example 22, the method of any of Examples 18-21 further includes configuring two CSI-RS resource sets with a single CSI-RS resources for interference measurement to be performed on NZP CSI-RS signals or CSI-IM signals, each CSI resource setting for channel measurement comprising the two CSI-RS resource sets.

In Example 23, the method of any of Examples 18-22 further includes configuring a single CSI-RS resource set with two CSI-RS resources for interference measurement to be performed on NZP CSI-RS signals or CSI-IM signals.

In Example 24, the method of any of Examples 18-23 further includes transmitting a RRC message including an indication of aperiodic CSI-RS resource sets for the first CSI-RS and the second CSI-RS that are associated with a trigger state, wherein the aperiodic CSI-RS resource sets.

In Example 25, the method of any of Examples 18-24 further includes transmitting an indication of a single periodic or semi-persistent CSI-RS resource set for the first CSI-RS and the second CSI-RS, wherein the single periodic or semi-persistent CSI-RS resource set is configured with two CSI-RS resources.

In Example 26, the method of any of Examples 18-25 further includes that the first CSI-RS comprises a primary CSI-RS resource for determining the CQI, the RI, and the PMI, and wherein the second CSI-RS comprises a subsidiary CSI-RS resource for determining a dissimilarity between the first CSI-RS and the second CSI-RS.

In Example 27, the method of any of Examples 18-26 further includes transmitting, to the UE, an indication that the first CSI-RS is the primary CSI-RS resource or that the second CSI-RS is the subsidiary CSI-RS resource.

In Example 28, the method of any of Examples 18-27 further includes that the primary CSI-RS resource comprises a configuration of a report quantity for the CQI, the RI, and the PMI.

In Example 29, the method of any of Examples 18-28 further includes that the subsidiary CSI-RS resource does not comprise a report quantity for the CQI, the RI, and the PMI.

In Example 30, the method of any of Examples 18-29 further includes transmitting an association indication that indicates an association between the primary CSI-RS resource and the subsidiary CSI-RS resource, wherein the association indication is transmitted in at least one of a first configuration for the primary CSI-RS resource or a second configuration for the subsidiary CSI-RS resource.

In Example 31, the method of any of Examples 18-30 further includes transmitting an indication of an association between the subsidiary CSI-RS resource and an SRS resource for the precoded SRS, wherein the indication is transmitted in at least one of a first configuration for the primary CSI-RS resource or a second configuration for the subsidiary CSI-RS resource.

Example 32 is a device including one or more processors and one or more memories in electronic communication with the one or more processors storing instructions executable by the one or more processors to cause the device to implement a method as in any of Examples 18-30.

Example 33 is a system or apparatus including means for implementing a method or realizing an apparatus as in any of Examples 18-30.

Example 34 is a non-transitory computer readable medium storing instructions executable by one or more processors to cause the one or more processors to implement a method as in any of Examples 18-30.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication at a user equipment (UE), comprising:
   receiving a first channel state information reference signal (CSI-RS) on a first set of beams;
   receiving a second CSI-RS on a second set of beams;
   determining a channel quality indicator (CQI), a rank indicator (RI), and a precoding matrix indicator (PMI) based on the first CSI-RS;
   transmitting a report that includes the CQI and the RI via an uplink control channel; and
   transmitting a precoded sounding reference signal (SRS) that indicates the PMI, wherein the SRS is precoded based on a dissimilarity between a measurement of the first CSI-RS and the second CSI-RS.

2. The method of claim 1, further comprising:
   determining the dissimilarity between the first CSI-RS and the second CSI-RS; and
   precoding an SRS to generate the precoded SRS based on the dissimilarity determined between the first CSI-RS and the second CSI-RS to indicate the PMI.

3. The method of claim 1, further comprising:
   transmitting a non-precoded SRS prior to receiving the first CSI-RS and the second CSI-RS.

4. The method of claim 3, wherein the first CSI-RS is associated with a defined precoder, and wherein the second CSI-RS is associated with a precoder based at least in part on an uplink channel estimate of the non-precoded SRS.

5. The method of claim 1, wherein a reporting setting of the UE for the report comprises a parameter indicating that the report setting is for frequency division duplex (FDD) analog channel state information feedback (CSF).

6. The method of claim 1, further comprising:
   performing interference measurement on non zero power (NZP) CSI-RS signals or on channel state information interference measurement (CSI-IM) signals, each CSI resource setting for channel measurement comprising two CSI-RS resource sets, wherein each of the two CSI-RS resource sets is configured with a single CSI-RS resource.

7. The method of claim 1, wherein further comprising:
   performing an interference measurement on non zero power (NZP) CSI-RS signals or channel state information interference measurement (CSI-IM) signals, each CSI resource setting for channel measurement comprising a single CSI-RS resource set configured with two CSI-RS resources.

8. The method of claim 1, further comprising:
   receiving a radio resource control (RRC) message that includes a bitmap including an indication of aperiodic CSI-RS resource sets for the first CSI-RS and the second CSI-RS that are associated with a trigger state.

9. The method of claim 1, further comprising:
   receiving an indication of a single periodic or semi-persistent CSI-RS resource set for the first CSI-RS and the second CSI-RS, wherein the single periodic or semi-persistent CSI-RS resource set is configured with two CSI-RS resources.

10. The method of claim 1, wherein the first CSI-RS comprises a primary CSI-RS resource for determining the CQI, the RI, and the PMI, and wherein the second CSI-RS comprises a subsidiary CSI-RS resource for determining the dissimilarity between the first CSI-RS and the second CSI-RS.

11. The method of claim 10, further comprising:
    receiving an indication that indicates the first CSI-RS is the primary CSI-RS resource or that the second CSI-RS is the subsidiary CSI-RS resource.

12. The method of claim 10, wherein the UE determines that the first CSI-RS comprises the primary CSI-RS resource based on a configuration of a report quantity for the CQI, the RI, and the PMI for the first CSI-RS.

13. The method of claim 12, wherein the UE determines that the second CSI-RS comprises the subsidiary CSI-RS resource based on the report quantity for the CQI, the RI, and the PMI not being configured for the second CSI-RS.

14. The method of claim 12, further comprising:
    receiving an association indication that indicates a first association between the primary CSI-RS resource and the subsidiary CSI-RS resource, wherein the association indication is received in at least one of a first configuration for the primary CSI-RS resource or a second configuration for the subsidiary CSI-RS resource, or
    receiving an indication of a second association between the subsidiary CSI-RS resource and an SRS resource for the precoded SRS, wherein the indication is received in at least one of the first configuration for the primary CSI-RS resource or the second configuration for the subsidiary CSI-RS resource.

15. A method of wireless communication at a base station, comprising:
- transmitting a first channel state information reference signal (CSI-RS) on a first set of beams;
- transmitting a second CSI-RS on a second set of beams;
- receiving an uplink control channel from a user equipment (UE) that includes a report of a channel quality indicator (CQI) and a rank indicator (RI) based on the first CSI-RS;
- receiving a precoded sounding reference signal (SRS) from the UE, wherein the precoded SRS is precoded based on a dissimilarity between a measurement of the first CSI-RS and the second CSI-RS; and
- determining a precoding matrix indicator (PMI) based on the precoded SRS.

16. The method of claim 15, further comprising:
- receiving a non-precoded SRS prior to transmitting the first CSI-RS and the second CSI-RS; and
- determining a precoder for the second CSI-RS based on an uplink channel estimate of the non-precoded SRS received from the UE, wherein the first CSI-RS is transmitted using a defined precoder.

17. The method of claim 15, wherein the reporting setting of the UE for the report comprises a parameter indicating the report setting is for frequency division duplex (FDD) analog channel state information feedback (CSF).

18. The method of claim 17, further comprising:
- configuring two CSI-RS resource sets with a single CSI-RS resources for interference measurement to be performed on non zero power (NZP) CSI-RS signals or channel state information interference measurement (CSI-IM) signals, each CSI resource setting for channel measurement comprising the two CSI-RS resource sets.

19. The method of claim 15, further comprising:
- configuring a single CSI-RS resource set with two CSI-RS resources for interference measurement to be performed on non zero power (NZP) CSI-RS signals or channel state information interference measurement (CSI-IM) signals.

20. The method of claim 15, further comprising:
- transmitting a radio resource control (RRC) message including an indication of aperiodic CSI-RS resource sets for the first CSI-RS and the second CSI-RS that are associated with a trigger state.

21. The method of claim 15, further comprising:
- transmitting an indication of a single periodic or semi-persistent CSI-RS resource set for the first CSI-RS and the second CSI-RS, wherein the single periodic or semi-persistent CSI-RS resource set is configured with two CSI-RS resources.

22. The method of claim 15, wherein the first CSI-RS comprises a primary CSI-RS resource for determining the CQI, the RI, and the PMI, and wherein the second CSI-RS comprises a subsidiary CSI-RS resource for a dissimilarity measurement between the first CSI-RS and the second CSI-RS.

23. The method of claim 22, further comprising:
- transmitting, to the UE, an indication that the first CSI-RS is the primary CSI-RS resource or that the second CSI-RS is the subsidiary CSI-RS resource.

24. The method of claim 22, wherein the primary CSI-RS resource comprises a configuration of a report quantity for the CQI, the RI, and the PMI.

25. The method of claim 22, wherein the subsidiary CSI-RS resource does not comprise a report quantity for the CQI, the RI, and the PMI.

26. The method of claim 22, further comprising:
- transmitting an association indication that indicates an association between the primary CSI-RS resource and the subsidiary CSI-RS resource, wherein the association indication is transmitted in at least one of a first configuration for the primary CSI-RS resource or a second configuration for the subsidiary CSI-RS resource.

27. The method of claim 22, further comprising:
- transmitting an indication of an association between the subsidiary CSI-RS resource and an SRS resource for the precoded SRS, wherein the indication is transmitted in at least one of a first configuration for the primary CSI-RS resource or a second configuration for the subsidiary CSI-RS resource.

28. An apparatus for wireless communication at a user equipment (UE), comprising:
- memory; and
- at least one processor coupled to the memory and configured to:
  - receive a first channel state information reference signal (CSI-RS) on a first set of beams;
  - receive a second CSI-RS on a second set of beams;
  - determine a channel quality indicator (CQI), a rank indicator (RI), and a precoding matrix indicator (PMI) based on the first CSI-RS;
  - transmit a report that includes the CQI and the RI via an uplink control channel; and
  - transmit a precoded sounding reference signal (SRS) that indicates the PMI, wherein the SRS is precoded based on a dissimilarity between a measurement of the first CSI-RS and the second CSI-RS.

29. An apparatus for wireless communication at a base station, comprising:
- memory; and
- at least one processor coupled to the memory and configured to:
  - transmit a first channel state information reference signal (CSI-RS) on a first set of beams;
  - transmit a second CSI-RS on a second set of beams;
  - receive an uplink control channel from a user equipment (UE) that includes a report of a channel quality indicator (CQI) and a rank indicator (RI) based on the first CSI-RS;
  - receive a precoded sounding reference signal (SRS) from the UE, wherein the precoded SRS is precoded based on a dissimilarity between a measurement of the first CSI-RS and the second CSI-RS; and
  - determine a precoding matrix indicator (PMI) based on the precoded SRS.

\* \* \* \* \*